United States Patent
Dix

(10) Patent No.: US 12,207,579 B2
(45) Date of Patent: Jan. 28, 2025

(54) POSITION MONITORING FOR AGRICULTURAL SYSTEM

(71) Applicant: CNH Industrial America LLC, New Holland, PA (US)

(72) Inventor: Peter John Dix, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/347,762

(22) Filed: Jul. 6, 2023

(65) Prior Publication Data
US 2023/0345853 A1 Nov. 2, 2023

Related U.S. Application Data

(63) Continuation of application No. 16/412,588, filed on May 15, 2019, now Pat. No. 11,770,992.

(51) Int. Cl.
| | | |
|---|---|---|
| *A01B 63/14* | (2006.01) | |
| *A01B 63/00* | (2006.01) | |
| *A01B 76/00* | (2006.01) | |
| *G05D 1/00* | (2024.01) | |

(52) U.S. Cl.
CPC ............ *A01B 63/14* (2013.01); *A01B 63/002* (2013.01); *A01B 76/00* (2013.01); *G05D 1/0088* (2013.01)

(58) Field of Classification Search
CPC ....... A01B 49/00; A01B 49/02; A01B 49/027; A01B 63/00; A01B 63/002; A01B 63/14; A01B 76/00; G05D 1/00; G05D 1/0088; G05D 1/02; G05D 1/021; G05D 1/0231; G05D 1/0246; G05D 1/0276; G05D 1/0278; G05D 2201/00; G05D 2201/02
See application file for complete search history.

(56) References Cited

U.S. PATENT DOCUMENTS

| | | |
|---|---|---|
| 4,288,814 A | 9/1981 | Talley et al. |
| 4,365,268 A | 12/1982 | Allen et al. |
| 4,555,725 A | 11/1985 | Geiersbach et al. |
| 4,769,700 A | 9/1988 | Pryor |
| 5,240,079 A | 8/1993 | Schmidt |

(Continued)

FOREIGN PATENT DOCUMENTS

AU    A2697999    5/1999

OTHER PUBLICATIONS

"Agriculture Camera Systems," Agricultural Back-Up Cameras and Rear View Camera Kits, Camera Source, https://camera-source.com/agriculture-cams.html, retrieved Mar. 23, 2017, 7 pgs.

*Primary Examiner* — Charles J Han
(74) *Attorney, Agent, or Firm* — Rickard K. DeMille; Rebecca L. Henkel; Peter K. Zacharias

(57) ABSTRACT

A position monitoring system for an agricultural system includes a controller having a memory and a processor. The controller is configured to receive a remote sensor signal from a remote sensor indicative of a state of a reference element on one of a work vehicle or an agricultural implement coupled to the work vehicle, determine an orientation of the agricultural implement relative to the work vehicle based at least in part on the remote sensor signal, and output a control signal to control operation of the agricultural system based at least in part on the orientation of the agricultural implement relative to the work vehicle.

17 Claims, 6 Drawing Sheets

(56) References Cited

U.S. PATENT DOCUMENTS

| | | | |
|---|---|---|---|
| 5,956,079 A | | 9/1999 | Ridgley |
| 6,954,999 B1 * | | 10/2005 | Richardson ............. E02F 5/145 |
| | | | 701/50 |
| 7,147,241 B2 | | 12/2006 | Beaujot et al. |
| 8,190,364 B2 | | 5/2012 | Rekow |
| 8,706,341 B2 | | 4/2014 | Madsen et al. |
| 9,114,832 B2 | | 8/2015 | Wang et al. |
| 9,255,811 B2 | | 2/2016 | Edelen |
| 9,374,939 B2 | | 6/2016 | Pickett et al. |
| 9,566,911 B2 | | 2/2017 | Greenwood et al. |
| 10,143,126 B2 | | 12/2018 | Foster et al. |
| 10,251,329 B2 | | 4/2019 | Foster et al. |
| 2015/0153456 A1 | | 6/2015 | Feller et al. |
| 2017/0006759 A1 | | 1/2017 | Adamchuk et al. |
| 2020/0198587 A1 * | | 6/2020 | Du .......................... B60S 1/485 |

* cited by examiner

POSITION MONITORING FOR AGRICULTURAL SYSTEM

CROSS REFERENCE TO RELATED APPLICATION

The present application is a continuation of U.S. patent application Ser. No. 16/412,588, entitled "POSITION MONITORING FOR AGRICULTURAL SYSTEM", filed May 15, 2019, which is hereby incorporated by reference in its entirety.

BACKGROUND

The disclosure relates generally to a position monitoring system for an agricultural system.

This section is intended to introduce the reader to various aspects of art that may be related to various aspects of the present disclosure, and are described below. This discussion is believed to be helpful in providing the reader with background information to facilitate a better understanding of the various aspects of the present disclosure. Accordingly, it should be noted that these statements are to be read in this light, and not as admissions of prior art.

Agricultural systems are used to farm a field, and a particular agricultural system may include a work vehicle and an agricultural implement towed behind the work vehicle. The agricultural implement may perform a farming operation, such as tilling, planting, and so forth, and the work vehicle may move across a field to drive the agricultural implement across the field. In some instances, the agricultural implement may be angled at an undesirable orientation relative to the work vehicle, and may reduce a performance of the agricultural system in farming the field. Furthermore, it may be difficult to determine how the agricultural implement is oriented relative to the work vehicle.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a position monitoring system for an agricultural system includes a controller having a memory and a processor. The controller is configured to receive a remote sensor signal from a remote sensor indicative of a state of a reference element on one of a work vehicle or an agricultural implement coupled to the work vehicle, determine an orientation of the agricultural implement relative to the work vehicle based at least in part on the remote sensor signal, and output a control signal to control operation of the agricultural system based at least in part on the orientation of the agricultural implement relative to the work vehicle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
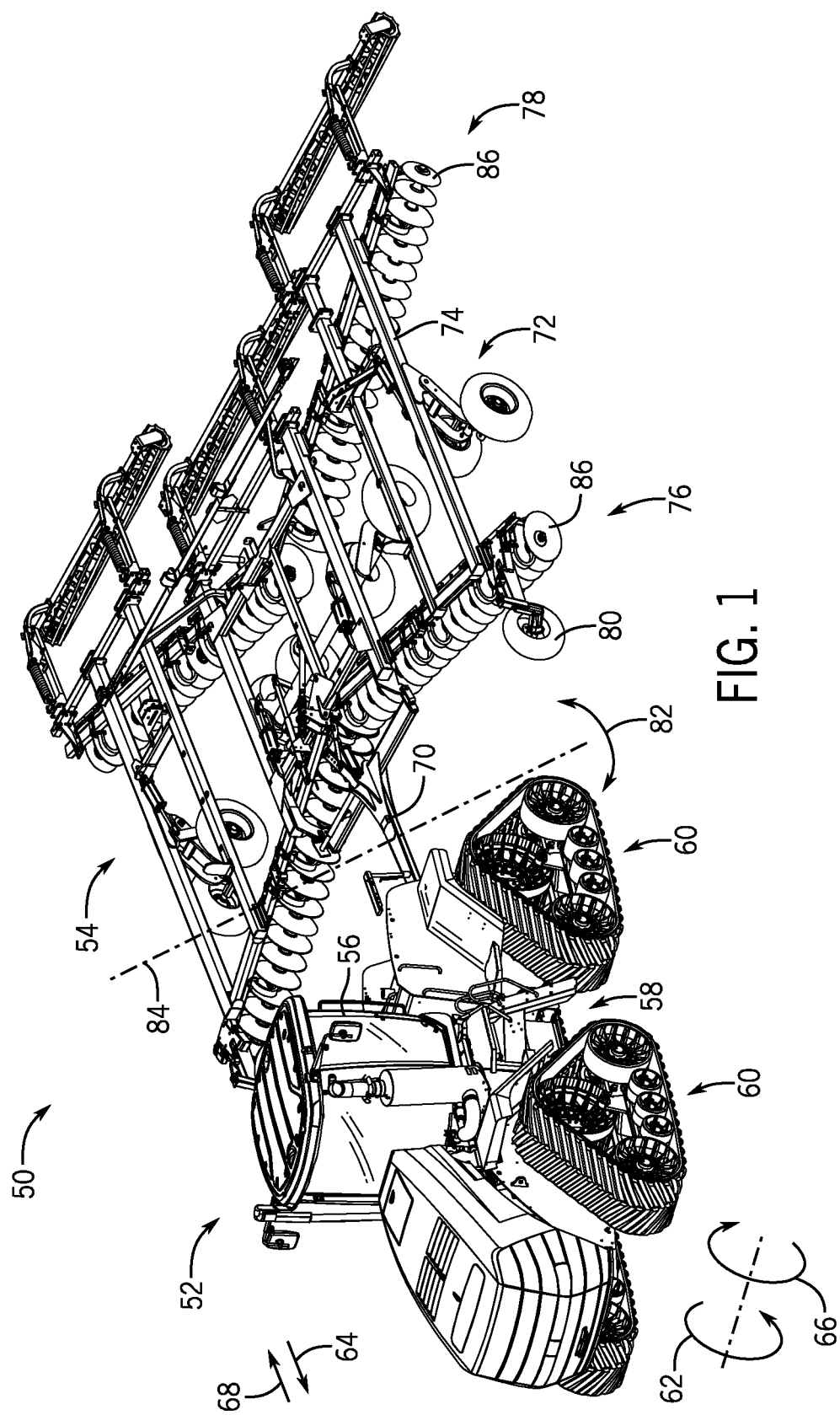
FIG. 1 is a perspective view of an embodiment of an agricultural system having a work vehicle and an agricultural implement, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to an agricultural system used to farm a field. The agricultural system may include an agricultural implement that may perform a farming operation. The agricultural implement may be attached to a work vehicle that moves across the field to enable the agricultural implement to perform the farming operation on the field. In some cases, the agricultural implement may be angled at an undesirable orientation relative to the work vehicle during operation of the agricultural system. For instance, soil of the field may have a property that exerts a force onto the agricultural implement, such as by having uneven rigidity, which may have been created from a previous operation on the field. Furthermore, the contour of the field may be uneven, such as having slopes, dips, bumps, and the like. The unevenness of the soil and of the field may cause the agricultural implement to rotate relative to the work vehicle. Continued operation of the agricultural system while the agricultural implement is in an undesired orientation relative to the work vehicle may reduce performance of the agricultural system. For example, the agricultural implement may farm certain areas of the field incompletely or inefficiently.

Thus, it is desired to monitor the orientation of the agricultural implement to determine if the agricultural system is operating efficiently. As used herein, the "orientation of the agricultural implement" refers to an orientation of the agricultural implement with respect or relative to a work vehicle to which the agricultural implement is attached. In the embodiments disclosed herein, the agricultural system may include a position monitoring system configured to determine the orientation of the agricultural implement. For example, the position monitoring system may include a reference element disposed on the agricultural implement and a sensor disposed on the work vehicle. The sensor may be configured to determine a state of the reference element. As used herein, the state of the reference element may include a position, orientation, size, shape, and the like of the reference element. The agricultural system may include a controller that receives feedback from the sensor indicative of the state of the reference element. The controller may further determine the orientation of the agricultural implement based on the determined state of the reference element. In some embodiments, the operation of the agricultural system may be controlled based on the determined orientation of the agricultural implement, such as to move the agricultural implement to a desired orientation. As such, the position monitoring system may enable the agricultural system to operate more efficiently to farm the field.

Turning to the drawings, FIG. 1 is a perspective view of an embodiment of an agricultural system 50 that includes a work vehicle 52 and an agricultural implement 54. In the illustrated embodiment, the work vehicle 52 is a tractor. However, in some embodiments, the work vehicle 52 may be an on-road truck, a harvester, and so forth that may be driven over a field, such as a farming field. As illustrated, the work vehicle 52 includes a cab 56 mounted on a chassis 58. The chassis 58 may support components, such as a motor, a hydraulic system (e.g., a pump, valves, a reservoir), an electrical system (e.g., a control system), a cooling system (e.g., an engine coolant system, a heating, ventilation, and/or air conditioning system), and the like to facilitate operation of the work vehicle 52. Additionally, the work vehicle 52 includes tracks 60 that operate to drive the work vehicle 52 through the field. For example, the front and/or the rear tracks 60 may rotate in a first rotational direction 62 (e.g., a forward rotational direction) to drive the work vehicle 52 in a first direction 64 (e.g., a forward direction), and the front and/or rear tracks 60 may rotate in a second rotational direction 66 (e.g., reverse rotational direction), opposite the first rotational direction 62, to drive the work vehicle 52 in a second direction 68 (e.g., backward direction), opposite the first direction 64. The tracks 60 may also be steered (e.g., via articulation of the chassis 58). In other embodiments, the work vehicle may include wheels instead of or in addition to tracks to enable maneuvering of the work vehicle.

The cab 56 is configured to house an operator of the work vehicle 52 during operation of the agricultural system 50, and may provide access to various controls of the work vehicle 52. For example, the cab 56 may include a user interface to enable the user to control the operation of certain systems of the work vehicle 52 and/or the agricultural implement 54. In some embodiments, the cab 56 may include a component, such as a steering wheel, to enable the operator to steer the tracks 60 and turn the work vehicle 52. Additionally or alternatively, the cab may include other types of user interfaces (e.g., a touch screen, a hand controller, a push button, a tracking pad) configured to receive user input or feedback and control various operations and systems of the work vehicle and/or the agricultural implement based on the user input or feedback. In certain embodiments, the agricultural system may be an autonomous system configured to operate without an operator. That is, the operation of the work vehicle and/or the agricultural implement of the agricultural system may be automatically controlled based on a detected operating parameter of the agricultural system.

Moreover, the chassis 58 of the work vehicle 52 is coupled to the agricultural implement 54 to enable the work vehicle 52 to tow the agricultural implement 54. For example, the chassis 58 may be coupled to a hitch 70 of the agricultural implement 54. The agricultural implement 54 may include support wheels 72 that enable the agricultural implement 54 to move, such as over the field through which the work vehicle 52 is navigating. Thus, movement of the work vehicle 52 may also cause movement of the agricultural implement 54. For example, navigation of the work vehicle 52 in the first direction 64 drives the agricultural implement 54 to move in the first direction 64, and navigation of the work vehicle 52 in the second direction 68 drives the agricultural implement 54 to move in the second direction 68.

The agricultural implement 54 includes a frame 74 to which the support wheels 72 are coupled. As illustrated in FIG. 1, the support wheels 72 are located between a first end 76 (e.g., front end) of the agricultural implement 54 and a second end 78 (e.g., rear end) of the agricultural implement 54. The agricultural implement 54 may include gauge wheels 80 that are coupled to the frame 74, such as at the first end 76. The gauge wheels 80 may be used to reduce lateral and/or vertical movement of the agricultural implement 54 while the agricultural system 50 is in operation. For example, the gauge wheels 80 may engage the field while the work vehicle 52 pulls the agricultural implement 54, such that rotation of the agricultural implement 54 in yaw directions 82 about a vertical axis 84 is reduced.

In the illustrated embodiment, the agricultural implement 54 is a tilling implement (e.g., vertical tilling implement) that includes blades 86 coupled to the frame 74. During operation of the agricultural system 50, the frame 74 of the agricultural implement 54 may be positioned to insert the blades 86 into the ground. For example, the support wheels 72 may be positioned to set the position of the frame 74 with respect to the ground. As the agricultural implement 54 is pulled by the work vehicle 52, the blades 86 may rotate while engaged with soil to till the soil. In additional or alternative embodiments, the agricultural implement may have a different type or configuration of a tilling implement, or the agricultural implement may be a different type of implement, such as a planter, a seeder, a harvester, a sprayer, a mower, and the like, and may be configured to perform a different farming operation on the field.

Figure 2:
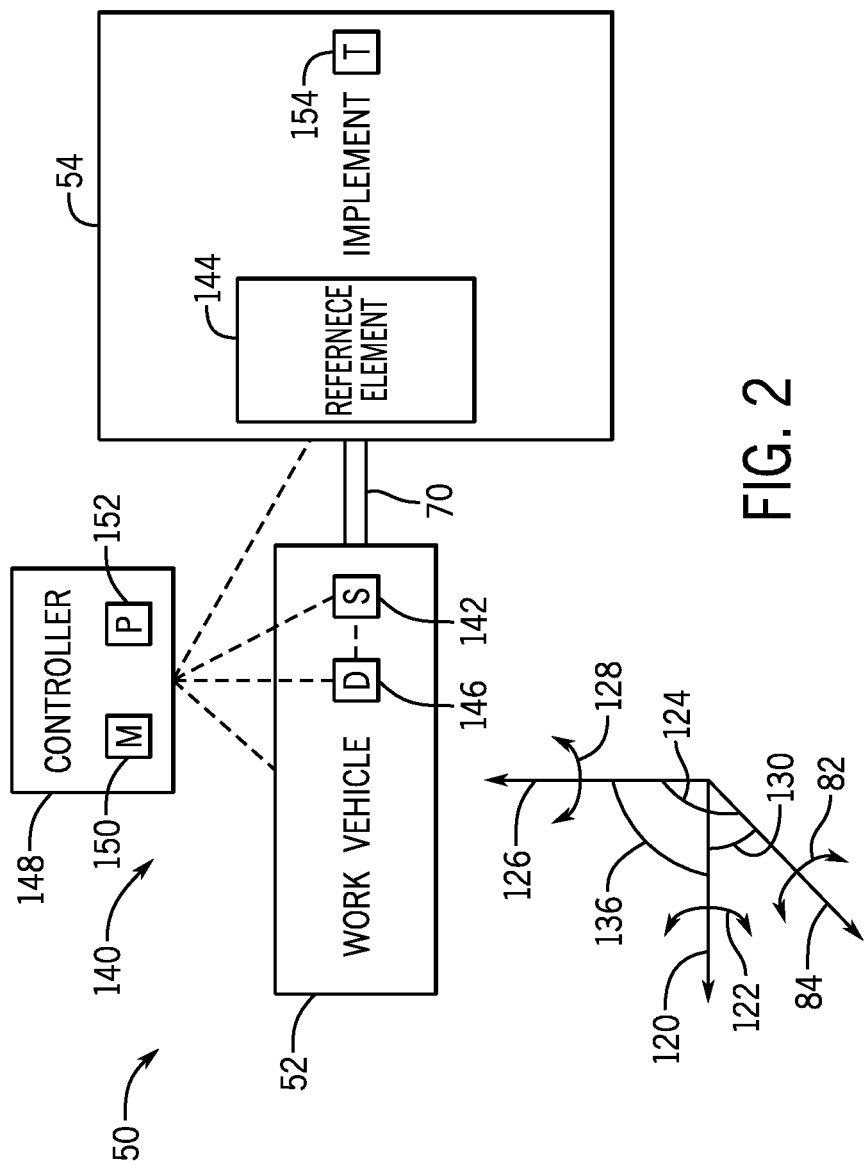
FIG. 2 is a schematic diagram of an embodiment of an agricultural system having a work vehicle and am agricultural implement, in accordance with an aspect of the present disclosure.

FIG. 2 is a schematic diagram of an embodiment of an agricultural system 50 having a work vehicle 52 and an agricultural implement 54. In some circumstances, during operation of the agricultural system 50, the agricultural implement 54 may become angled at an undesired orientation relative to the work vehicle 52. For example, due to the terrain of the field (e.g., a hill, a dip, an obstacle), the agricultural implement 54 may roll, pitch, or yaw to become oriented at an angle relative to the work vehicle 52. As used herein, roll refers to rotation of the agricultural implement 54 about a longitudinal axis 120 via first rotational directions 122, which may produce a roll angle 124 between the agricultural implement 54 and the work vehicle 52. Pitch refers to rotation of the agricultural implement 54 about a lateral axis 126 via second rotational directions 128, which may produce a pitch angle 130 between the agricultural implement 54 and the work vehicle 52. Yaw refers to rotation of the agricultural implement 54 about the vertical axis 84 via third rotational directions 134, which may produce a yaw angle 136 between the agricultural implement 54 and the work vehicle 52. Continued operation of the agricultural system 50 while the agricultural implement 54 is at an undesirable roll angle 124, pitch angle 130, yaw angle 136, or a combination thereof, with respect to the work vehicle 52 may reduce a performance of the agricultural implement 54 in performing an operation within the field. By way of example, the agricultural implement 54 may not be driven over certain areas of the field, and the operation within the field may be incomplete.

The agricultural system 50 includes a position monitoring system 140 configured to monitor the orientation of the agricultural implement 54 (e.g., relative to the work vehicle 52). The position monitoring system 140 may include a remote sensor 142 disposed on the work vehicle 52. The position monitoring system 140 may also include a reference element 144, such as a sticker, a protrusion, and/or another physical object, configured to couple (e.g., via an adhesive, a fastener) to or otherwise be disposed on the agricultural implement 54. In additional or alternative embodiments, the remote sensor 142 may be disposed on the agricultural implement 54, and the reference element 144 may be disposed on the work vehicle 52. The remote sensor 142 is configured to output a signal indicative of a state of the reference element 144. The state of the reference element 144 may be indicative of an orientation of the agricultural implement 54 (e.g., in yaw, pitch, roll, or a combination thereof). Thus, the remote sensor 142 may be used to monitor the orientation of the agricultural implement 54. The remote sensor 142 may not be directly coupled (e.g., physically, electrically) to the reference element 144 and, therefore, determines the state of the reference element 144 remotely.

Although the position monitoring system 140 includes one remote sensor 142 and one reference element 144 in the illustrated embodiment, the position monitoring system may include any suitable number of remote sensors and reference elements. For example, the position monitoring system may use multiple remote sensors and one reference element, one remote sensor and multiple reference elements, or multiple remote sensors and multiple reference elements. The use of multiple remote sensors and/or multiple reference elements may enable the orientation between the agricultural implement 54 and the work vehicle 52 to be determined with greater accuracy and/or along a larger number of axes. For instance, multiple determinations of the orientation between the agricultural implement 54 and the work vehicle 52 may be performed, and the determinations may be cross-referenced to more accurately determine the orientation between the agricultural implement 54 and the work vehicle 52. In one example, a first determined orientation between the agricultural implement 54 and the work vehicle 52 (e.g., based on a first reading received from a first remote sensor configured to view the reference element from a first perspective) and a second determined orientation between the agricultural implement 54 and the work vehicle 52 (e.g., based on a second reading received from a second remote sensor configured to view the reference element from a second perspective) may be compared to one another. The orientation between the agricultural implement 54 and the work vehicle 52 may be verified if the first determined orientation and the second determined orientation match with one another. However, if the first determined orientation does not match the second determined orientation, an average (e.g., mathematical mean) of the determine orientations may be used as the orientation between the agricultural implement 54 and the work vehicle 52. It should also be noted that, instead of or in addition to the reference element, the remote sensor may output a signal indicative of a state of an existing part of the implement, such as the lateral end(s), a component of the frame, and so forth, or a general shape of the agricultural implement. In such embodiments, the position monitoring system may not have an additional component (e.g., the reference element 144) that is disposed onto the agricultural implement.

In certain embodiments, the remote sensor 142 may be an optical sensor, such as a camera, configured to capture a visual image of the reference element 144. In such embodiments, the agricultural system 50 may include a light source that enhances the ability of the remote sensor 142 to identify the reference element 144 (e.g., by directing light onto the reference element 144 to create a clearer visual image of the reference element 144). The color of the lighting emitted by the light source may be selectable to enhance the visibility of the reference element 144 (e.g., in differently lighted conditions). Additionally or alternatively, the reference element may include a reflector that reflects light to increase illumination of the reference element, thereby enhancing the ability of the remote sensor to identify the reference element. The lighting may be directed at the reflector, which causes the light to illuminate on the reference element. In certain embodiments, the use of the lighting may be controlled automatically. For example, lighting may be directed at the reference element based on the determined condition (e.g., amount of lighting around the agricultural system).

In additional or alternative implementations, the remote sensor may be a position sensor, such as a light detection and ranging (LIDAR) sensor, an infrared sensor, a photoelectric sensor, or another suitable type of position sensor configured to determine the state of the reference element. For instance, the position sensor may emit a signal (e.g., a first sensor signal) toward the reference element and may receive a response signal (e.g., a second sensor signal), such as sensor signal(s) reflected off the reference element. The additional signals received by the position sensor may be indicative of the state of the reference element. Using such position sensors may limit the extent that debris (e.g., dirt, precipitation) affects identifying the state of the reference element, and such position sensors may accurately identify the state of the reference element due to their insensitivity to debris. Additionally or alternative, the agricultural system may use multiple different types of remote sensors to determine the orientation between the work vehicle and the agricultural implement.

The remote sensor may further be used as an alternative to another sensing system, such as a global navigation satellite system (GNSS), which may determine an orientation of the agricultural implement relative to the work vehicle. However, the remote sensor and the reference element may be easier to install onto multiple work vehicles and agricultural implements than the GNSS. Further, a cost associated with utilizing the remote sensor and the reference element with multiple agricultural implements may be less than a cost associated with installing the GNSS onto multiple agricultural implements. In some embodiments, the remote sensor and reference element may be used in addition to the GNSS. For example, the orientation between the work vehicle and the agricultural implement indicated by the remote sensor may be compared with the orientation between the work vehicle and the agricultural implement indicated by the GNSS to determine a final orientation between the work vehicle and the agricultural implement. Thus, using the remote sensor and the reference element in conjunction with the GNSS may determine the orientation between the work vehicle and the agricultural implement with greater accuracy.

The remote sensor may also be used in performing other functions, in addition to facilitating determination of the orientation of the agricultural implement. In certain implementations, the remote sensor may be used to detect obstacles on the field. As an example, the operator may use the output of the remote sensor to survey or observe the field, such that the operator may drive the work vehicle across the field to avoid obstacles, such as while moving backward. The remote sensor (e.g., a camera) may display an image to the operator to enable the operator to navigate the field. In certain embodiments, such as for an automated agricultural system, the remote sensor may identify obstacles and determine the position of such obstacles, and the agricultural system may be automatically controlled based on the position of the obstacles to maneuver around such obstacles.

In some embodiments, the remote sensor 142 may be configured to output the signal indicative of the position and/or orientation of the agricultural implement 54 to a display 146 (e.g., within the user interface in the cab). In one example, the remote sensor 142 may output a signal indicative of a visual image of the reference element 144. In another example, the remote sensor 142 may output other data indicative of the position and/or orientation of the agricultural implement 54. The other data may be presented on the display 146. As such, an operator of the work vehicle 52 may use the image and/or data presented on the display 146 to control the operation of the agricultural system 50 based on the state of the reference element 144.

In the illustrated embodiment, the position monitoring system 140 includes a controller 148 communicatively coupled to the remote sensor 142. The controller 148 is configured to receive the signal from the remote sensor 142 that is indicative of the state of the reference element 144. The controller 148 may determine an orientation of the agricultural implement 54 based on the signal received from the remote sensor 142 and outputs a signal to control the operation of the agricultural system 50 based on the orientation of the agricultural implement 54. For example, the controller 148 may control an operation of the work vehicle 52 and/or of the agricultural implement 54 to change the orientation between the work vehicle 52 and the agricultural implement 54. The controller 148 includes a memory 150 and a processor 152 configured to execute software code or instructions stored on the memory 150, such as to instruct components of the agricultural system 50 to control the operation of the agricultural system 50. The term "code" or "software code" used herein refers to any instructions or set of instructions that control the operation of the controller. The code or software code may exist in a computer-executable form, such as machine code, which is the set of instructions and data directly executed by the processor 152 of the controller 148, a human-understandable form, such as source code, which may be compiled in order to be executed by the processor 152 of the controller 148, or an intermediate form, such as object code, which is produced by a compiler. As used herein, the term "code" or "software code" also includes any human-understandable computer instructions or set of instructions, e.g., a script, that may be executed on the fly with the aid of an interpreter executed by the processor 152 of the controller 148.

As an example, the memory 150 may store processor-executable software code or instructions (e.g., firmware or software), which are tangibly stored on a tangible computer readable medium. Additionally or alternatively, the memory may store data (e.g., data associated with a location or position of the reference elements). As an example, the memory 150 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 152 may include multiple microprocessors, one or more "general-purpose" microprocessors, one or more special-purpose microprocessors, and/or one or more application specific integrated circuits (ASICS), or some combination thereof. For example, the processor 152 may include one or more reduced instruction set (RISC) or complex instruction set (CISC) processors.

The controller 148 may be configured to determine the orientation between the work vehicle 52 and the agricultural implement 54 and to output a signal to control the operation of the work vehicle 52 and/or the agricultural implement 54 based at least in part on the determined orientation between the work vehicle 52 and the agricultural implement 54. As an example, the controller 148 may output a signal to control the work vehicle 52 to adjust a steering angle, a ground speed, and so forth, to drive the agricultural implement 54 to move relative to the work vehicle 52, thereby changing the orientation between the agricultural implement 54 and the work vehicle 52. The signal, which may be a trim feature that adjusts how the agricultural implement 54 is oriented with the work vehicle, may be manually operated (e.g., via an operator), or automatically operated based on the determined orientation between the work vehicle 52 and the agricultural implement 54. In certain embodiments, the controller 148 may be configured to operate the work vehicle 52 to travel along a route or swath (e.g., of a plan). The controller 148 may determine a position of the work vehicle 52 (e.g., via the GNSS), an inertial measurement unit (IMU), and so forth. The controller 148 may determine the actual route traveled by the agricultural implement 54 based on the orientation between the work vehicle and the agricultural implement 54. For example, the controller 148 may determine the angle of yaw, pitch, and/or roll between the work vehicle 52 and the agricultural implement 54, and may use the determined angle with the position of the work vehicle 52 to determine the position of the agricultural implement 54. The controller 148 may use the position of the agricultural implement 54 to determine an actual route traveled by the agricultural implement 54. The controller 148 may then compare the actual route traveled by the agricultural implement 54 with the route to determine whether the agricultural implement 54 is following the route (e.g., based on whether the agricultural implement 54 is in a target position associated with the pre-programmed route), and the controller 148 may output the signal to control the work vehicle 52 based on the comparison.

In some embodiments, the controller 148 may directly control the operation of the work vehicle 52 and/or the agricultural implement 54. In additional or alternative embodiments, the controller may be communicatively coupled to a separate controller (e.g., a work vehicle controller, an agricultural implement controller) that directly controls the operation of the work vehicle and/or the agricultural implement, and may instruct the separate controller to control the work vehicle and/or the agricultural implement. The controller 148 may control the work vehicle 52 to change the orientation between the agricultural implement 54 and the work vehicle 52 to a desired orientation, which may be a threshold angle range (e.g., within 5 degrees of a desired angle), a direction of travel of the work vehicle 52 and/or the agricultural implement 54, or any combination thereof. In an additional example, the controller 148 may output a signal to control the agricultural implement 54 to change the orientation between the agricultural implement 54 and the work vehicle 52. In some embodiments, the agricultural implement 54 may include an engagement tool 154, and the controller 148 may control the engagement tool 154 to engage the field (e.g., to push and/or pivot the agricultural implement 54) and change the orientation of the agricultural implement 54. In additional or alternative embodiments, the controller may output a signal to control the agricultural implement 54 to adjust a different operation, such as a steering angle, to change the orientation of the agricultural implement 54.

The controller may additionally or alternatively output a notification and/or other information (e.g., onto the display 146) indicative of a recommended control action. For instance, the controller may output instructions to the user interface of the cab indicative of a suggested manual operation to control the agricultural system, such that the orientation between the work vehicle and the agricultural implement may be adjusted toward a desired orientation. As such, the user may manually control the operation of the agricultural system based on the notification and/or information output by the controller.

It should be noted that the work vehicle 52 may be configured to couple to different agricultural implements 54, each having a different reference element 144. As such, the controller 148 may be configured to determine the orientation of the particular agricultural implement 54 coupled to the work vehicle 52 based on the state of the particular reference element 144 of the particular agricultural implement 54. For example, the position monitoring system 140 may be calibrated to determine the position and/or orientation of the agricultural implement 54 coupled to the work vehicle 52 based on the state of the reference element 144. In some embodiments, the calibrations may be stored in the memory 150, and may be retrieved and/or selected for use in different agricultural systems based on the type of work vehicle and/or agricultural implement (e.g., sent by another controller or manually input). As such, the calibration steps may not have to be repeated for different agricultural systems. The controller 148 may be disposed on the work vehicle 52 or at a remote location to avoid disposing any additional electrical equipment onto the agricultural implement 54. In this manner, because the reference element is only part of the agricultural implement 54, different agricultural implements 54 may be attached to the work vehicle 52 without having to change physical connections (e.g., electrical wiring) between components of the position monitoring system 140.

Existing agricultural systems may be retrofitted with the position monitoring system 140. That is, the remote sensor may be installed onto an existing work vehicle, the reference element may be installed onto an existing agricultural implement, and/or the controller may be used to control the operation of the existing work vehicle and the existing agricultural implement based on the feedback from the remote sensor. In certain embodiments, the position monitoring system 140 may be a kit that includes the remote sensor, the reference element, the controller, or a combination thereof, and may be readily implemented onto any existing agricultural system. In additional or alternative embodiments, the remote sensor (e.g., rearview camera) may already be a part of the work vehicle, and the kit may include only the reference element and the software. In further embodiments, the reference element may be a fixed component of the agricultural implement, and the kit may include only the software to configure the remote sensor to determine the state of the reference element. Additionally, although the remote sensor 142 is disposed on the work vehicle 52 and the reference element 144 is disposed on the agricultural implement 54 in the illustrated embodiment, the remote sensor may be disposed on the agricultural implement and the reference element may be disposed on the work vehicle in additional or alternative embodiments.

Figure 3:
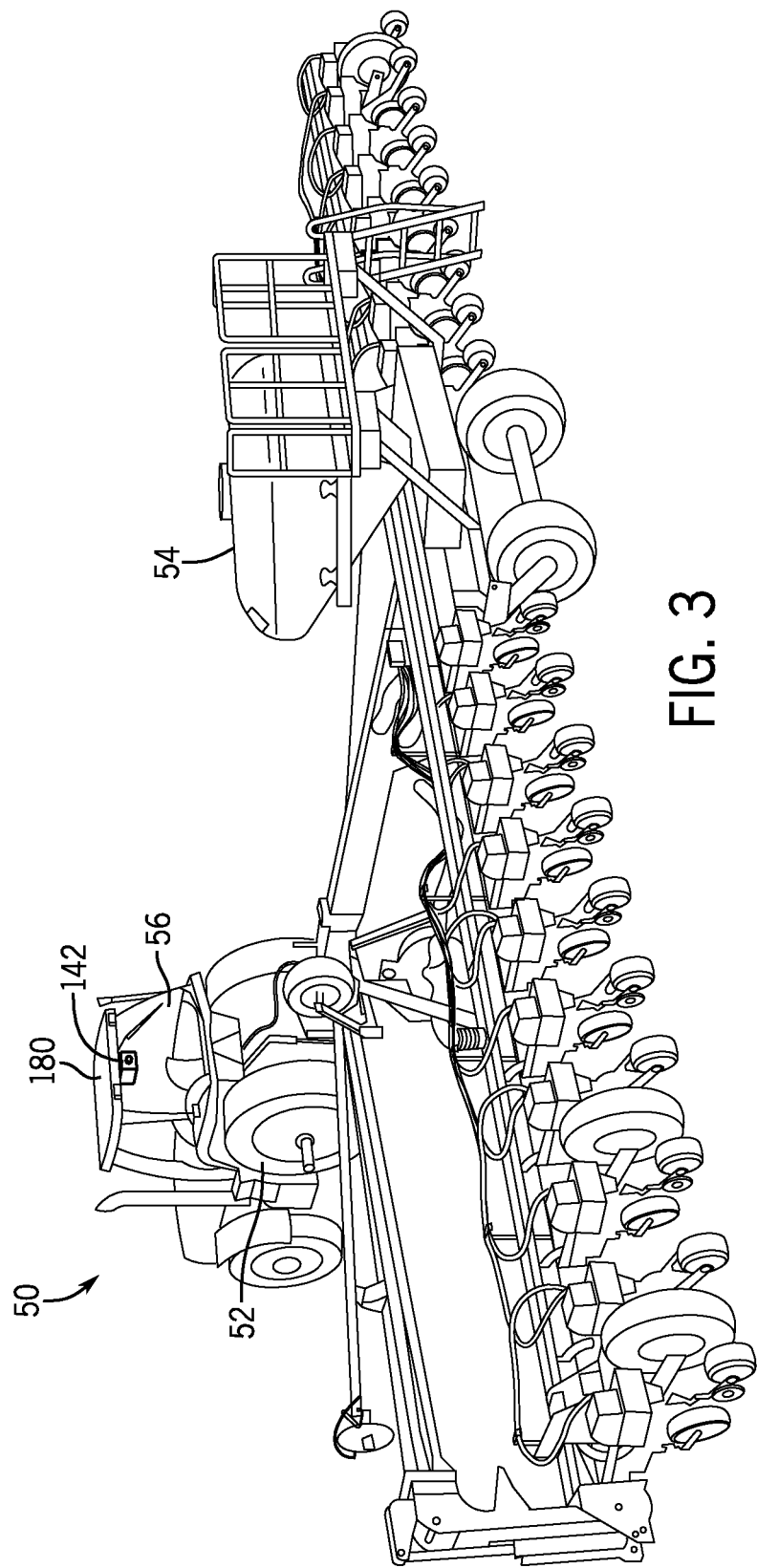
FIG. 3 is a rear perspective view of an embodiment of an agricultural system having a work vehicle and an agricultural implement, in accordance with an aspect of the present disclosure.

FIG. 3 is a rear perspective view of an embodiment of the agricultural system 50 having the work vehicle 52 and the agricultural implement 54. In the illustrated embodiment, the remote sensor 142 is coupled to the cab 56 of the work vehicle 52 (e.g., disposed within the cab 56 to protect the remote sensor 142 from external debris). As shown in FIG. 3, the remote sensor 142 may generally face toward the agricultural implement 54. The remote sensor 142 may be positioned near a roof 180 of the cab 56 to provide the remote sensor 142 with a better field of view of the agricultural implement 54. In addition, positioning the remote sensor 142 at a greater height may reduce the effect of debris, other components of the agricultural system 50, and other objects that may obstruct the view of the agricultural implement 54.

Figure 4:
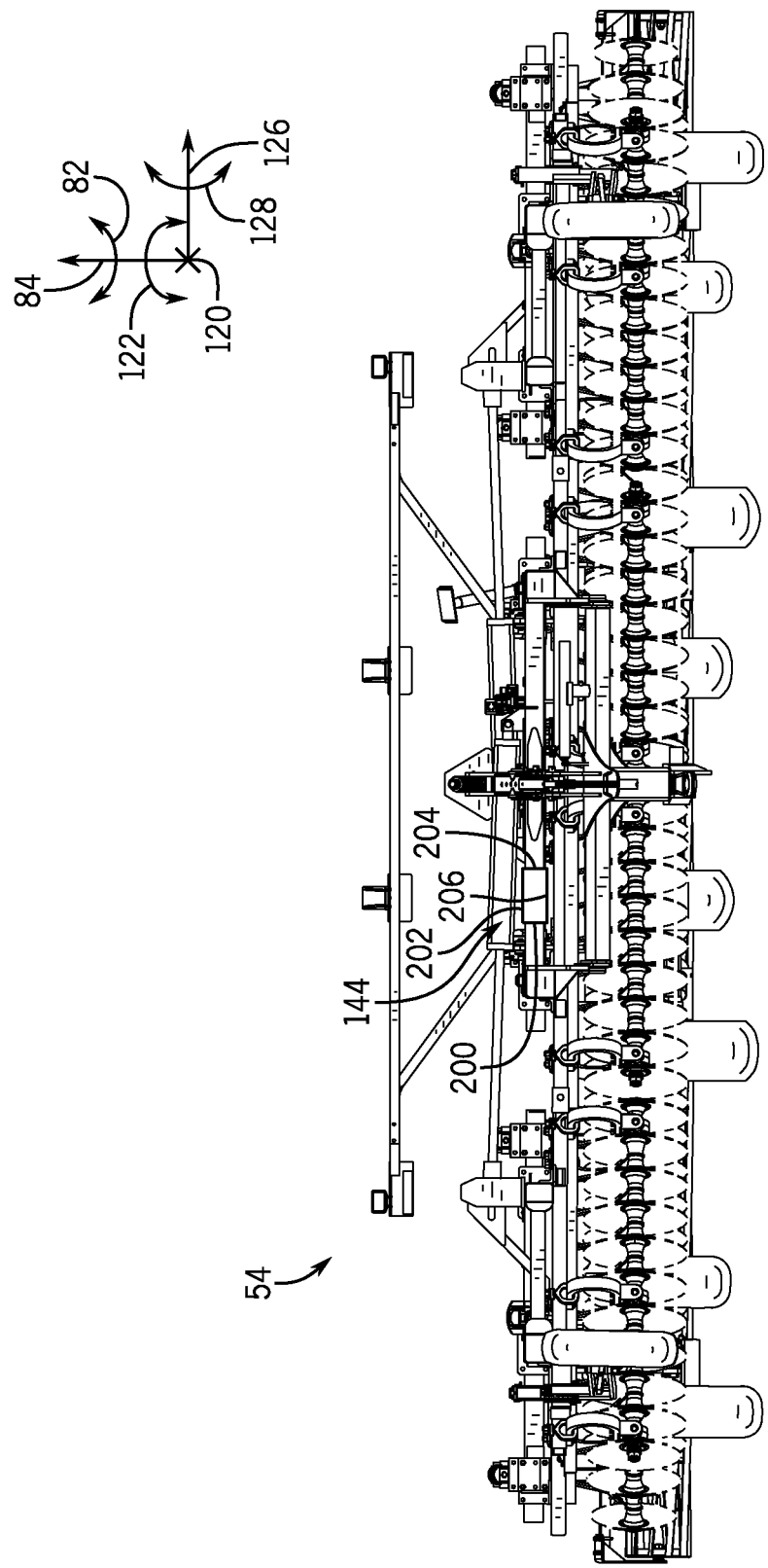
FIG. 4 is a front view of an embodiment of an agricultural implement having a reference element, in accordance with an aspect of the present disclosure.

FIG. 4 is a front view of an embodiment of the agricultural implement 54 having the reference element 144. In the illustrated embodiment, the reference element 144 is an object having a rectangular shape that may be coupled to the agricultural implement 54 via an adhesive, a fastener, a welded connection, another suitable component, or any combination thereof. The remote sensor of the position monitoring system may monitor the state (e.g., geometric configuration) of the reference element 144 to enable the controller to determine the orientation of the agricultural implement 54. In some embodiments, the controller may determine a geometric configuration of a first leg 200, a second leg 202, a third leg 204, and/or a fourth leg 206 of the reference element 144 to determine the state of the reference element 144 and of the agricultural implement 54.

As an example, when the agricultural implement 54 is angled in a desired orientation (e.g., the agricultural implement 54 is not rotated in yaw, pitch, or roll with respect to the work vehicle 52), the first leg 200 and the second leg 204 may be substantially the same length as one another, and the first leg 200 and the second leg 204 may each be substantially aligned with the vertical axis 84. Moreover, the second leg 202 and the fourth leg 206 may be substantially the same length as one another, and the second leg 202 and the fourth leg 206 may each be substantially aligned with the lateral axis 126.

The controller may compare the length of the first leg 200 and the length of the third leg 204 with one another to determine the yaw with respect to the work vehicle. By way of example, if the controller determines that the length difference between the first leg 200 and the third leg 204 is greater than a threshold difference (e.g., 5%, 10%, 15% length difference), the controller may determine that the agricultural implement 54 has moved in one of the third rotational directions 134 about the vertical axis 84. In this way, the controller determines the agricultural implement 54 has rotated in yaw with respect to the work vehicle. As a result, the controller may control the operation of the agricultural system (e.g., of the work vehicle and/or of the agricultural implement 54) until the controller determines the orientation of the agricultural implement 54 is no longer rotated in yaw with respect to the work vehicle (e.g., when the first leg 200 and the third leg 204 appear to have substantially no length difference).

Further, the controller may compare the length of the second leg 202 and the length of the fourth leg 206 with one another to determine the pitch with respect to the work vehicle. For instance, if the controller determines that the length difference between the second leg 202 and the fourth leg 206 is greater than a threshold difference, the controller may determine that the agricultural implement 54 has moved in one of the second rotational directions 128 about the lateral axis 126. That is, the controller determines the agricultural implement 54 has rotated in pitch with respect to the work vehicle. As such, the controller may control the operation of the agricultural system until the controller determines that the orientation of the agricultural implement 54 is no longer rotated in pitch with respect to the work vehicle (e.g., when the second leg 202 and the fourth leg 206 appear to have substantially no length difference).

In addition, the controller may determine a geometric configuration of each of the legs 200, 202, 204, 206 to determine the roll with respect to the work vehicle. For example, if the controller determines that an angle of the first leg 200 and/or the third leg 204 with respect to the vertical axis 84 is greater than a threshold amount (e.g., greater than 5 degrees, 10 degrees, 15 degrees), and/or that an alignment of the second leg 202 and/or the fourth leg 206 with respect to the lateral axis 126 is greater than a threshold amount, the controller may determine that the agricultural implement 54 has moved in one of the first rotational directions 122 about the longitudinal axis 120. Thus, the controller determines the agricultural implement 54 has rotated in roll with respect to the work vehicle. For this reason, the controller may control the particular operation of the agricultural system until the controller determines that the orientation of the agricultural implement 54 is no longer rotated in roll with respect to the work vehicle (e.g., the first leg 200 and the third leg 204 are substantially aligned with the vertical axis 126, and/or the second leg 202 and the fourth leg 206 are substantially aligned with the lateral axis 126).

In some embodiments, the controller may determine an orientation of the agricultural implement 54 based on the geometric configuration of the legs 200, 202, 204, 206. That is, for instance, the controller may correspond the length difference between the first leg 200 and the second leg 204 to a yaw angle of the agricultural implement 54. Moreover, the controller may determine the length difference between the second leg 202 and the fourth leg 206 to a pitch angle of the agricultural implement 54. Further still, the controller may correspond the angle of the first leg 200 and/or the third leg 204 with respect to the vertical axis 84, and/or the angle of the second leg 202 and/or the fourth leg 206 with respect to the lateral axis 126 to a roll angle of the agricultural implement 54. Based on the orientation of the agricultural implement 54, the controller may control the operation of the agricultural system (e.g., a specific steering angle of the work vehicle and/or the agricultural implement 54) to adjust the orientation of the agricultural implement toward a desired orientation.

Figure 5:
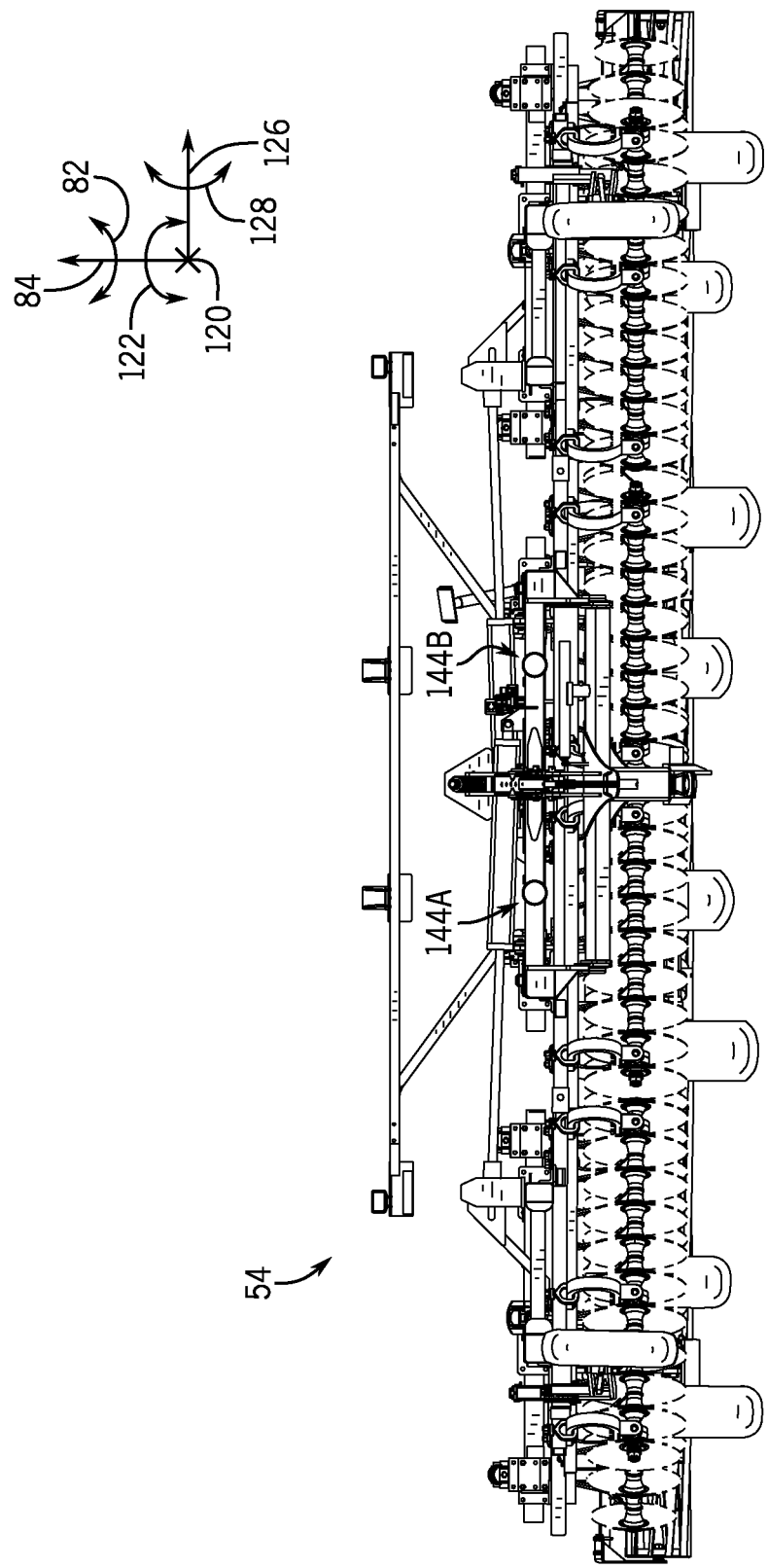
FIG. 5 is a front view of an embodiment of an agricultural implement having a first reference element and a second reference element, in accordance with an aspect of the present disclosure.

FIG. 5 is a front view of an embodiment of the agricultural implement 54 having a first reference element 144A and a second reference element 144B. As illustrated in FIG. 5, each reference element 144A, 144B is coupled to the agricultural implement 54 and has a substantially circular shape. The controller may determine an alignment of the reference elements 144A, 144B with one another and/or a state of the reference elements 144A, 144B to determine the orientation of the agricultural implement 54. In additional or alternative embodiments, there may be a different number of reference elements, the reference elements may be oriented relative to one another in a different manner, and/or the reference elements may of a different shape than shown in FIG. 5, or a combination thereof, and the controller may determine the respective states of such reference elements to determine the orientation of the agricultural implement.

For instance, when the agricultural implement 54 is angled in a desired orientation (e.g., the agricultural implement 54 is not rotated in yaw, pitch, roll, or any combination thereof with respect to the work vehicle), the first reference element 144A may be of a particular size with respect to the second reference element 144B. Moreover, the position of the first reference element 144A may be located in a particular position with respect to the position of the second reference element 144B. Further still, the first reference element 144A and the second reference element 144B may each have a particular shape.

The controller may compare a relative state of the first reference element 144A with the second reference element 144B. That is, the controller may compare the state of the first reference element 144A with the state of the second reference element 144B. For example, the controller may compare the size of the first reference element 144A and the size of the second reference element 144B with one another to determine the yaw with respect to the work vehicle. In some embodiments, the size of the first reference element 144A and the size of the second reference element 144B may be substantially the same while the agricultural implement 54 is in the desired orientation. Therefore, if the controller determines a size difference between the first reference element 144A and the second reference element 144B, the controller may determine that the agricultural implement 54 has moved in one of the third rotational directions 134 about the vertical axis 84 and is rotated in yaw with respect to the work vehicle. For this reason, the controller may control the operation of the agricultural system until the controller determines the agricultural implement 54 is no longer rotated in yaw with respect to the work vehicle (e.g., there is substantially no size difference between the first reference element 144A and the second reference element 144B).

Additionally, the relative state of reference elements 144 may include an alignment of the first reference element 144A with respect to the second reference element 144B. Moreover, the controller may determine a fixed state of the reference elements 144, or a state of the reference elements 144 that is not compared with one another. The fixed state may include an alignment of the first reference element 144A and/or the second reference element 144B with respect to the vertical axis 84, to determine if the agricultural implement 54 is rolled with respect to the desired orientation. By way of example, the first reference element 144A may be aligned with the second reference element 144B with respect to the lateral axis 126, and the first reference element 144A and the second reference element 144B may each be aligned with the vertical axis 84, while the agricultural implement 54 is in the desired orientation. Thus, if the controller determines that the angle between the first reference element 144A and the second reference element 144B with respect to the lateral axis 126, and/or the angle between the first reference element 144A and the vertical axis 84 and/or between the second reference element 144B and the vertical axis 84 is greater than a threshold amount, the controller may determine that the agricultural implement 54 has moved in one of the first rotational directions 122 about the longitudinal axis 120 and is rotated in roll with respect to the work vehicle. As such, the controller may control the particular operation of the agricultural system until the controller determines that the agricultural implement is no longer rotated in roll with respect to the work vehicle (e.g., the first reference element 144A and the second reference element 144B are aligned with one another along the lateral axis 126, and/or the first reference element 144A and/or the second reference element 144B is aligned with the vertical axis 84).

The fixed state of the reference elements 144 may further include the shape of the reference elements 144A, 144B to determine the pitch with respect to the work vehicle. In some embodiments, the reference elements 144A, 144B may each have a substantially circular shape while the agricultural implement 54 is in the desired orientation. However, if the controller determines that the reference elements 144A, 144B have an elliptical shape or any other non-circular shape, the controller may determine that the agricultural implement 54 has moved in one of the second rotational directions 128 about the lateral axis 126 and is rotated in pitch with respect to the work vehicle. As a result, the controller may control the operation of the agricultural system until the controller determines that the agricultural implement is no longer rotated in pitch with respect to the work vehicle (e.g., the reference elements 144A, 144B have the circular shape).

In certain embodiments, the controller may determine a particular orientation of the agricultural implement 54 based on the state of the reference elements 144A, 144B. For example, the controller may determine a yaw angle of the agricultural implement 54 corresponding to the length difference between the first reference element 144A and the second reference element 144B. The controller may additionally determine a roll angle of the agricultural implement 54 corresponding to the angle between the first reference element 144A and the second reference element 144B along the lateral axis 126, between the first reference element 144A and the vertical axis 84, and/or between the second reference element 144B and the vertical axis 84. The controller may further determine a pitch angle of the agricultural implement 54 corresponding to the shape of the reference elements 144A, 144B. The controller may control the operation of the agricultural system based at least in part on the determined orientation of the agricultural implement 54 to adjust the orientation of the agricultural implement 54 toward the desired orientation.

Figure 6:
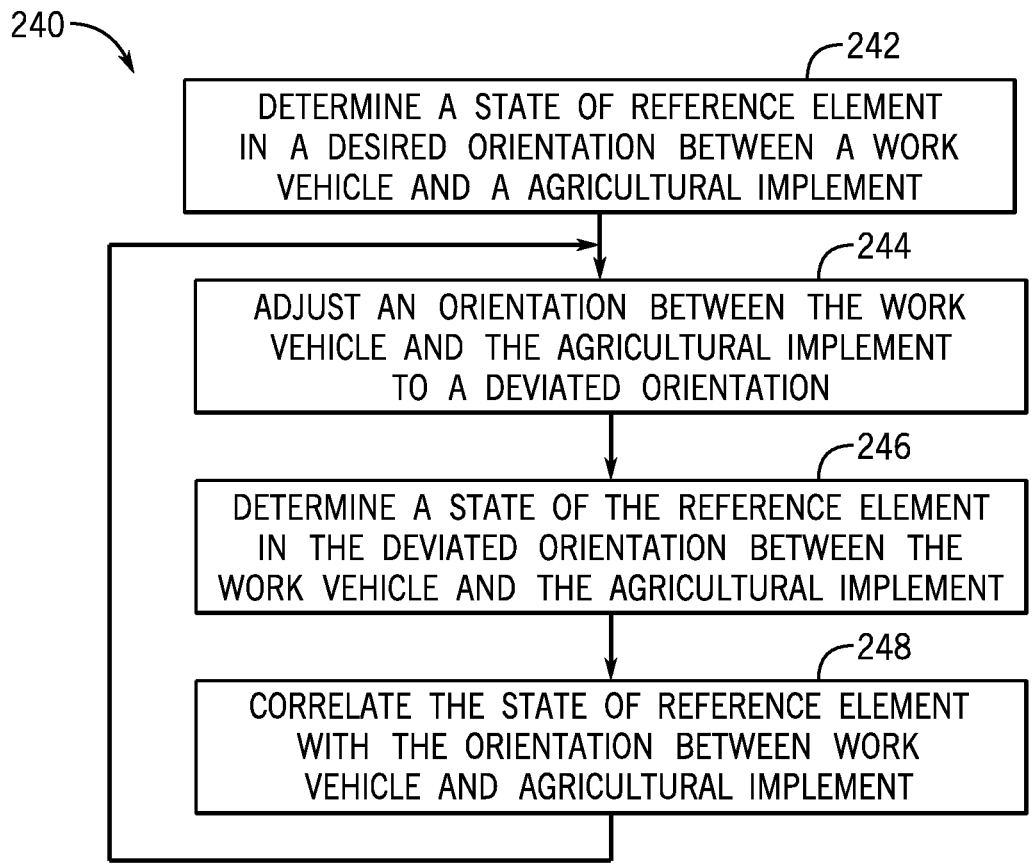
FIG. 6 is a flow diagram of an embodiment of a method or process for calibrating a position monitoring system to determine a relationship between the state of a reference element and the orientation of an agricultural implement, in accordance with an aspect of the present disclosure.
Figure 7:
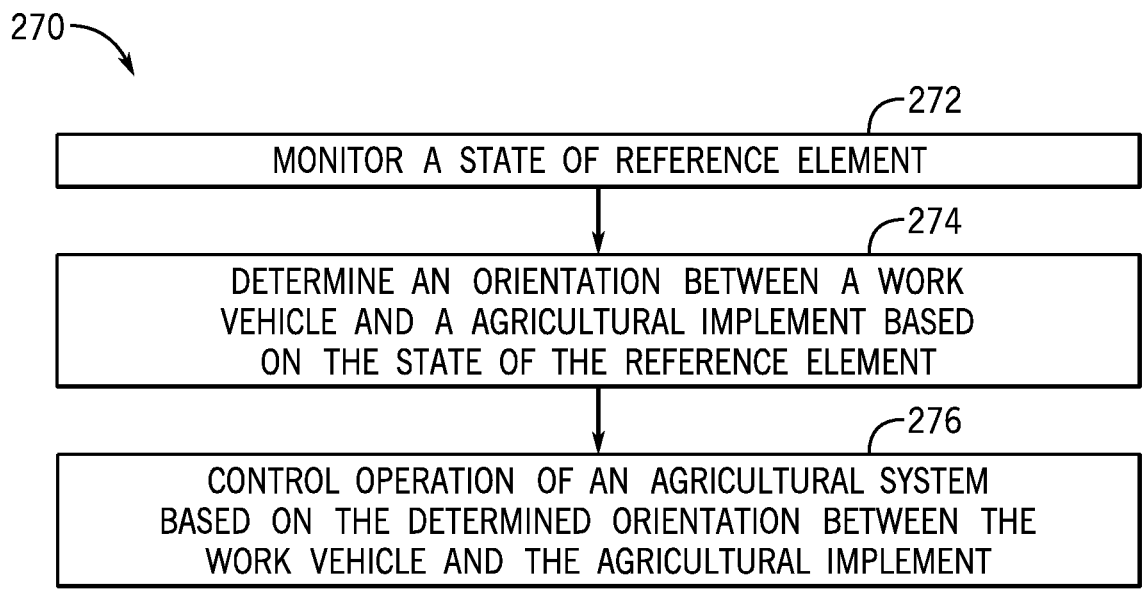
FIG. 7 is a flow diagram of an embodiment of a method or process for controlling the operation of an agricultural system based on a determined orientation of the agricultural implement.

FIGS. 6 and 7 each illustrate a respective method or process for using the position monitoring system. In some embodiments, each method may be performed by a controller, such as the controller 148 of FIG. 2. It should be noted that a method that is different than the respective methods depicted in FIGS. 6 and 7 may be performed, such as for a different configuration of the position monitoring system. For example, additional steps may be performed relative to the steps depicted in FIGS. 6 and 7, or certain steps described in FIGS. 6 and 7 may be removed, modified, or performed in a different order.

FIG. 6 is a flow diagram of an embodiment of a method or process 240 for calibrating the position monitoring system to determine a relationship between the state of the reference element(s) and the orientation of the agricultural implement. The calibration steps may be performed at a time prior to operation of the agricultural system, such as before field operations, at a manufacturing factory, and so forth. At block 242, the state of the reference element(s) is determined while the agricultural implement is at the desired orientation. As an example, the desired orientation of the agricultural implement refers to the orientation of the agricultural implement that is not rotated in yaw, pitch, roll, or any combination thereof, relative to the work vehicle. The monitored state of the reference element(s) may be set as a baseline or reference state. That is, if the state of the reference element(s) is determined to be different than the baseline state, it may be determined that the agricultural implement is not in the desired orientation.

At block 244, the orientation of the agricultural implement may be adjusted to a deviated orientation. As used herein, a deviated orientation refers to an orientation between the work vehicle and the agricultural implement in which the agricultural implement is rolled, pitched, yawed, or any combination thereof, relative to the desired orientation. In some embodiments, the agricultural implement may be set at a specific roll angle, pitch angle, yaw angle, or any combination thereof, relative to the work vehicle.

At block 246, the state of the reference element(s) is determined while the agricultural implement is at the deviated orientation. For instance, a geometric shape, a size, an alignment, and so forth of the reference element(s) is determined and associated with the deviated orientation of the agricultural implement. The state of the reference element(s) may be associated with the specific roll angle, pitch angle, yaw angle, or any combination thereof, of the agricultural implement. Additionally or alternatively, the state of the reference element(s) while the agricultural implement is at the deviated orientation may be compared to the state of the reference element(s) while the agricultural implement is at the desired orientation. Accordingly, a difference in the state of the reference element(s) while the agricultural implement is at the desired orientation and the state of the reference element(s) while the agricultural implement is at the deviated orientation may be determined.

At block 248, the state of the reference element(s) is correlated with the orientation of the agricultural implement. The correlation between the state of the reference element(s) and the orientation of the agricultural implement may be stored on the memory of the controller. In certain implementations, the correlation may be stored (e.g., in a cloud-based storage) such that multiple controllers may retrieve the correlation to implement in the respective operations of various agricultural systems. In some embodiments, a specific state of the reference element(s) may be associated with a certain value of the roll angle, pitch angle, yaw angle, or any combination thereof between the work vehicle and the agricultural implement. That is, the particular state of the reference element(s) may be associated with an extent to which the agricultural implement is rolled, pitched, yawed, or any combination thereof with respect to the desired orientation. For instance, the steps of blocks 244 to 248 may be repeated to determine how the change in the orientation between the agricultural implement and the work vehicle affects the state of the reference element(s). In this manner, a particular relationship between the state of the reference element(s) and the orientation between the agricultural implement and the work vehicle (e.g., relative to the desired orientation) may be established. However, the steps of blocks 244 to 248 may alternatively be performed once to correlate the state of the reference element(s) with the orientation between the work vehicle and the agricultural implement. In further embodiments, the calibration may only include the step of block 242. Thus, rather than correlating the state of the reference element with the orientation between the work vehicle and the agricultural implement, the controller may determine if the orientation between the work vehicle and the agricultural implement is not in the desired orientation based on the state of the reference element.

FIG. 7 is a flow diagram of an embodiment of a method or process 270 for controlling operation of the agricultural system based on the determined orientation of the agricultural implement. In some embodiments, the method 270 may be performed based on the calibration, as determined by the steps of the method 240 for establishing the relationship between the state of the reference element(s) and the orientation of the agricultural implement. For example, a previously performed calibration may be retrieved and implemented for use by the method 270. However, if a relevant calibration is not available, the steps of the method 240 may be performed prior to performing the method 270. At block 272, the state of the reference element(s) is monitored, such as via the remote sensor(s). The state of the reference element(s) may be continuously monitored. Additionally or alternatively, the state of the reference element(s) may be monitored at a certain frequency, such as a number of times within a time interval.

At block 274, the state of the reference element(s) is used to determine the orientation of the agricultural implement. For example, the orientation of the implement is determined based on feedback from the remote sensor using the calibration of the method 240. The particular state of the reference element may be used to determine if the agricultural implement is rolled, pitched, yawed, or any combination thereof, relative to the desired orientation. In further embodiments, the particular state of the reference element may be used to determine a particular extent (e.g., angle) that the agricultural implement is rolled, pitched, yawed, or any combination thereof, relative to the desired orientation.

At block 276, in response to determining the orientation of the agricultural implement, the operation of the agricultural system may be controlled. If the difference between the determined orientation and the desired orientation along at least one axis is greater than a threshold, the operation of the agricultural system may be controlled to reduce the difference between the determined orientation and the desired orientation. By way of example, the operation of the work vehicle and/or the agricultural implement may be controlled to drive the agricultural implement toward the desired orientation. For instance, the tracks and/or wheels of the work vehicle may be rotated, the wheels of the agricultural implement may be rotated, the ground engagement tool may be moved, another operation may be performed, or any combination thereof. The controlled operation of the agricultural system may be based on the difference between the determined orientation and the desired orientation, such as an extent that the agricultural implement is rolled, pitched, yawed, or any combination thereof, relative to the desired orientation. If the orientation between the work vehicle and the agricultural implement is determined to be the desired orientation, the operation of the agricultural system may be controlled to substantially maintain the orientation of the agricultural implement. In some embodiments, such as if the orientation of the agricultural implement is continuously determined, the operation of the agricultural system may be continuously controlled during operation of the agricultural system. In additional or alternative embodiments, such as if the orientation of the agricultural implement is determined at a particular frequency, the operation of the agricultural system may be controlled at a certain time interval (e.g., based on the particular frequency).

As mentioned, in certain embodiments, the agricultural system may be controlled to direct the agricultural implement to follow a route. That is, the orientation between the work vehicle and the agricultural implement may be used to determine a position of the agricultural implement with the field, and whether the agricultural implement is following the route. If the agricultural implement is not following the route, the operation of the agricultural system may be controlled to adjust the agricultural implement to follow the route. In some embodiments, the agricultural system may be operated to control movement of the agricultural implement with respect to a direction of travel of the work vehicle. For example, the agricultural system may be operated to adjust the orientation between the work vehicle and the agricultural implement to reduce drifting or slipping of the agricultural implement and to align the agricultural implement with the route.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A position monitoring system for an agricultural system comprising:
   a controller of a work vehicle of the agricultural system, wherein the controller comprises a memory and a processor, and the controller is configured to:
      receive, from a sensor on one of the work vehicle or an agricultural implement coupled to the work vehicle, an image of a first reference element and a second reference element on the other of the work vehicle or the agricultural implement;
      determine an orientation of the agricultural implement relative to the work vehicle by determining a yaw of the agricultural implement relative to the work vehicle based at least in part on a size of the first reference element relative to a size of the second reference element; and
      control an angle of the agricultural implement relative to the work vehicle based at least in part on the orientation of the agricultural implement relative to the work vehicle.

2. The position monitoring system of claim 1, wherein the controller is configured to determine the orientation of the agricultural implement relative to the work vehicle by determining a roll of the agricultural implement relative to the work vehicle based at least in part on a position of the first reference element relative to a position of the second reference element.

3. The position monitoring system of claim 1, wherein the first reference element comprises a reflector, the second reference element comprises a reflector, or each of the first and second reference elements comprises a respective reflector.

4. The position monitoring system of claim 1, comprising a light source configured to illuminate the first reference element, the second reference element, or the first and second reference elements.

5. The position monitoring system of claim 1, wherein the controller is configured to control the angle of the agricultural implement relative to the work vehicle by instructing wheels of the work vehicle to rotate, instructing wheels of the agricultural implement to rotate, instructing an engagement tool of the agricultural implement to move, or any combination thereof.

6. The position monitoring system of claim 1, wherein the controller is configured to determine the orientation of the agricultural implement relative to the work vehicle by determining a pitch of the agricultural implement relative to the work vehicle based at least in part on a shape of the first reference element and a shape of the second reference element.

7. A position monitoring system for an agricultural system, comprising:
 a first reference element and a second reference element configured to be disposed on one of a work vehicle or an agricultural implement coupled to the work vehicle;
 a sensor configured to be disposed on the other of the work vehicle or the agricultural implement; and
 a controller comprising a memory and a processor, wherein the controller is configured to:
  receive an image of the first reference element and the second reference element captured by the sensor;
  determine an orientation of the agricultural implement relative to the work vehicle by determining a yaw of the agricultural implement relative to the work vehicle based at least in part on a size of the first reference element relative to a size of the second reference element; and
  control an angle of the agricultural implement relative to the work vehicle based at least in part on the orientation of the agricultural implement relative to the work vehicle.

8. The position monitoring system of claim 7, wherein the sensor comprises a camera, and the camera is configured to capture the image of the first reference element and the second reference element.

9. The position monitoring system of claim 7, wherein the first reference element comprises a sticker, a protrusion, or both;
 the second reference element comprises a sticker, a protrusion, or both; or
 each of the first and second reference elements comprises a sticker, a protrusion, or both.

10. The position monitoring system of claim 7, wherein the controller is configured to determine the orientation of the agricultural implement relative to the work vehicle by determining a roll of the agricultural implement relative to the work vehicle based at least in part on a position of the first reference element relative to a position of the second reference element.

11. The position monitoring system of claim 7, wherein the first reference element and the second reference element are configured to be disposed on the agricultural implement, and the sensor is configured to be disposed on the work vehicle.

12. The position monitoring system of claim 7, wherein the first reference element has a circular shape, the second reference element has a circular shape, or each of the first and second reference elements has a circular shape.

13. The position monitoring system of claim 7, wherein the controller is configured to determine the orientation of the agricultural implement relative to the work vehicle by determining a pitch of the agricultural implement relative to the work vehicle based at least in part on a shape of the first reference element and a shape of the second reference element.

14. At least one non-transitory computer readable medium comprising executable instructions that, when executed by a processor, are configured to cause the processor to:
 receive, from a sensor on one of a work vehicle or an agricultural implement coupled to the work vehicle, an image of a first reference element and a second reference element on the other of the work vehicle or the agricultural implement;
 determine an orientation of the agricultural implement relative to the work vehicle by determining a yaw of the agricultural implement relative to the work vehicle based at least in part on a size of the first reference element relative to a size of the second reference element; and
 control an angle of the agricultural implement relative to the work vehicle based at least in part on the orientation of the agricultural implement relative to the work vehicle.

15. The at least one non-transitory computer readable medium of claim 14, wherein the executable instructions, when executed by the processor, are configured to cause the processor to determine the orientation of the agricultural implement relative to the work vehicle by determining a roll of the agricultural implement relative to the work vehicle based at least in part on a position of the first reference element relative to a position of the second reference element.

16. The at least one non-transitory computer readable medium of claim 14, wherein the executable instructions, when executed by the processor, are configured to cause the processor to control the angle of the agricultural implement relative to the work vehicle by at least one of instructing wheels of the work vehicle to rotate, instructing wheels of the agricultural implement to rotate, or instructing an engagement tool of the agricultural implement to move.

17. The at least one non-transitory computer readable medium of claim 14, wherein the executable instructions, when executed by the processor, are configured to cause the processor to determine the orientation of the agricultural implement relative to the work vehicle by determining a pitch of the agricultural implement relative to the work vehicle based at least in part on a shape of the first reference element and a shape of the second reference element.

* * * * *